(12) United States Patent
Lai et al.

(10) Patent No.: US 12,345,402 B1
(45) Date of Patent: Jul. 1, 2025

(54) SCROLL WHEEL WITH LIGHTING

(71) Applicant: Logitech Europe S.A., Lausanne (CH)

(72) Inventors: Yu Shiang Lai, Hsinchu (TW); Yu-Sen Chen, Hsinchu County (TW); Anthony Vuillemin, Zhubei (TW)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/621,860

(22) Filed: Mar. 29, 2024

(51) Int. Cl.
| | |
|---|---|
| *F21V 33/00* | (2006.01) |
| *F21V 3/06* | (2018.01) |
| *F21V 23/00* | (2015.01) |
| *G06F 3/0362* | (2013.01) |

(52) U.S. Cl.
CPC ........ *F21V 33/0052* (2013.01); *F21V 3/0625* (2018.02); *F21V 23/005* (2013.01); *G06F 3/0362* (2013.01)

(58) Field of Classification Search
CPC .............................. F21Y 2115/10; F21V 33/00
See application file for complete search history.

(56) References Cited

U.S. PATENT DOCUMENTS

| | | | | |
|---|---|---|---|---|
| 10,444,872 B2 * | 10/2019 | Hsueh | ................. | G06F 3/03543 |
| 10,725,568 B1 * | 7/2020 | Lin | ........................ | G06F 3/0362 |
| 10,775,908 B1 * | 9/2020 | Lin | ........................ | G06F 3/0362 |
| 11,416,085 B2 * | 8/2022 | Dou | ..................... | H01H 19/025 |

* cited by examiner

*Primary Examiner* — Robert J May
(74) *Attorney, Agent, or Firm* — Kilpatrick Townsend & Stockton LLP

(57) ABSTRACT

Some embodiments of the present disclosure propose a scroll wheel module that may be mounted in a mouse. The scroll wheel module may include a base plate; a carriage coupled to the base plate, wherein the carriage defines a cradle space comprising a first side wall; a scroll wheel at least partially rotatably received within the cradle space, wherein the scroll wheel comprises a shaft defining a hollow interior; a circuit board comprising a first leg and a second leg coupled with each other, wherein the first leg is coupled to the first side wall, and the second leg extends in the hollow interior of the shaft; and one or more light emitting elements coupled to the second leg of the circuit board.

17 Claims, 9 Drawing Sheets

SCROLL WHEEL WITH LIGHTING

BACKGROUND OF THE INVENTION

The present disclosure generally relates to computer mice, and in particular to a mouse including a roller or scroll wheel.

With the development of computer technologies, computer mice, together with keyboards, have become the most important peripheral devices. As a commonly used computer input device, a conventional mouse device comes with left and right buttons and a scroll wheel disposed between the left and right buttons. Operating the left and right buttons and the scroll wheel enables inputting different operating instructions to the computer. The scroll wheel is particularly crucial for the operation of video games on computers. Aesthetical appeal design of the computer mice helps win the attraction of many consumers, especially video game users. Light effect has been contemplated to improve the aesthetical design of computer mice. However, there is a great need in the industry to provide uniform or evenly distributed light effect to computer mice.

BRIEF SUMMARY OF THE INVENTION

Some embodiments of the present disclosure propose a scroll wheel module that may be mounted in a mouse. In some embodiments, the scroll wheel module may include a base plate; a carriage coupled to the base plate, wherein the carriage defines a cradle space comprising a first side wall; a scroll wheel at least partially rotatably received within the cradle space, wherein the scroll wheel includes a shaft defining a hollow interior; a circuit board comprising a first leg and a second leg coupled with each other, wherein the first leg is coupled to the first side wall, and the second leg extends in the hollow interior of the shaft; and one or more light emitting elements coupled to the second leg of the circuit board.

In some embodiments, the one or more light emitting elements include two light emitting elements, wherein an insulation element is positioned between the two light emitting elements.

In some embodiments, the scroll wheel includes an opaque layer axially sandwiched two side portions.

In some embodiments, a support plate horizontally extends from the first side wall and is coupled to the first side wall, and the circuit board is coupled to the support plate.

In some embodiments, the support plate is disposed substantially at a height of a axis of the shaft, and circuit board is configured to have the one or more light emitting elements are aligned with the axis of the shaft.

In some embodiments, the scroll wheel further includes a wheel rim comprising an outer layer and an inner layer coupled to the outer layer.

In some embodiments, the scroll wheel further includes a wheel web peripherally coupled to an inner side of the inner layer of the wheel rim, wherein the shaft axially passes through the wheel web.

In some embodiments, the inner layer of the wheel rim, the wheel web, and the shaft are formed in a one-piece structure made by a translucent plastic material.

In some embodiments, the outer layer of the wheel rim includes a plurality of beads disposed on an outer surface thereof and spaced from each other.

Some other embodiments of the present disclosure propose another scroll wheel module that may be mounted in a mouse. In some embodiments, the scroll wheel module may include a base plate; a carriage coupled to the base plate, wherein the carriage defines a cradle space comprising a first side wall; a scroll wheel at least partially rotatably received within the cradle space, wherein the scroll wheel includes a wheel rim, a wheel web peripherally coupled to the wheel rim, and a shaft axially passing through wheel web, wherein the wheel rim defines a recess space at either side of the wheel web; a first circuit board comprising a first leg and a second leg coupled with each other, wherein the first leg is coupled to the first side wall, and the second leg extends in the recess space; and one or more light emitting elements coupled to the second leg of the first circuit board.

In some embodiments, a first support plate horizontally extends from the first side wall and is coupled to the first side wall, and the first circuit board is coupled to the first support plate.

In some embodiments, the first support plate extends at a height over the shaft.

In some embodiments, the cradle space further includes a second side wall opposite the first side wall, and the scroll wheel module further includes: a second circuit board comprising a third leg and a fourth leg coupled with each other, wherein the third leg is coupled to the second side wall, and the fourth leg extends in the recess space; and one or more light emitting elements coupled to the fourth leg of the second circuit board.

In some embodiments, a second support plate horizontally extends from the second side wall and is coupled to the second side wall, and the second circuit board is coupled to the second support plate.

In some embodiments, the second support plate extends at a height over the shaft.

In some embodiments, the scroll wheel includes an opaque layer axially sandwiched two side portions.

In some embodiments, the wheel rim includes an outer layer and an inner layer coupled to the outer layer.

In some embodiments, the inner layer of the wheel rim, the wheel web, and the shaft are formed in a one-piece structure made by a translucent plastic material.

In some embodiments, the outer layer of the wheel rim includes a plurality of beads disposed on an outer surface thereof and spaced from each other.

Numerous benefits may be provided by the inventive concept of the present disclosure. For example, the light emitting elements positioned in the hollow interior space of the rotating shaft of the scroll wheel may efficiently use the space within the scroll wheel module. The circuit board bearing the light emitting elements may be attached to the side wall of the cradle. Such a configuration may prevent the wiring of the light emitting elements interfere with rotation of the scroll wheel. Similarly, arrangement of light emitting elements within the recess defined by the wheel rim and wheel web of scroll wheel may also efficiently use the space within the scroll wheel module and prevent interference between the wiring of light emitting elements and the rotation of the scroll wheel. Addition benefits and advantage inherent in the present disclosure may be apparent to a person of ordinary skill in the art upon reading the below detailed description and the appended claims. These and other benefits and advantages should be considered encompassed within the contemplation of the inventors of the present disclosure.

BRIEF DESCRIPTION OF THE DRAWINGS

FIG. 2A shows the scroll wheel module from a left front perspective, and FIG. 2B shows the scroll wheel module from a right front perspective.

FIGS. 6A and 6B show the perspective views of a scroll wheel module of a mouse according to some embodiments of the present disclosure, wherein FIG. 6A shows the scroll wheel module from a left front perspective, and FIG. 6B shows the scroll wheel module from a right front perspective.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Light emitting elements, such as, light emitting diodes (LEDs) may be incorporated in a mouse to provide light effect for the scroll wheel usually included in the mouse. To facilitate the positioning and wiring of the light emitting elements, embodiments of the present disclosure contemplate static light emitting elements instead of rotating light emitting elements. Some embodiments of the present disclosure include light emitting elements positioned in the hollow interior space of a rotating shaft of the scroll wheel. Some other embodiments include light emitting elements positioned above the rotating shaft of the scroll wheel.

Figure 1:
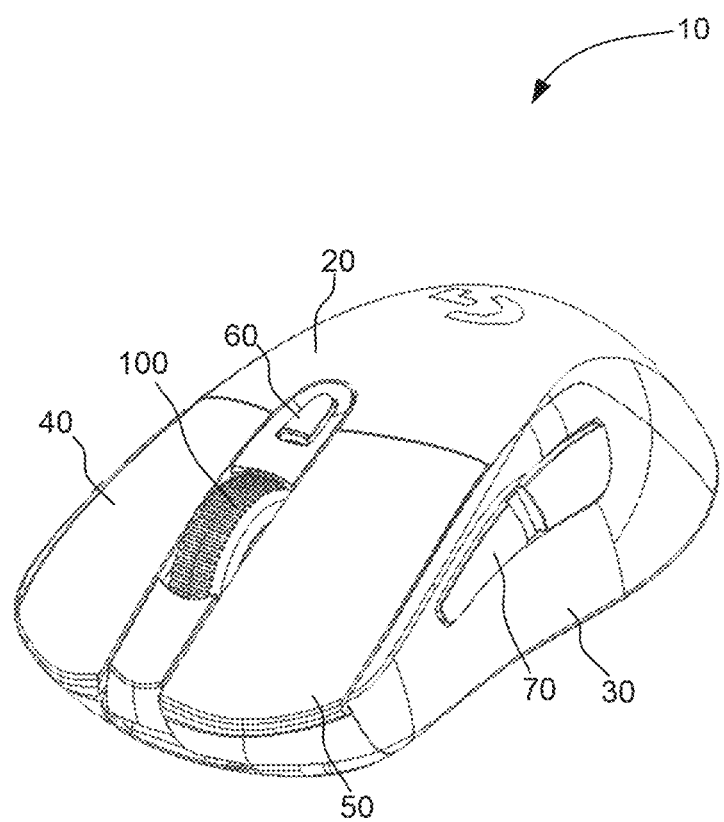
FIG. 1 shows a mouse according to some embodiments of the present disclosure.

FIG. 1 shows a mouse 10 according to some embodiments of the present disclosure. As illustrated, mouse 10 includes an upper housing 20 and a lower housing 30 coupled with each other to define an interior compartment for accommodating other components, such as, but not limited to, power source, circuit board, and sensors. Mouse 10 includes two buttons 40 and 50 at the front portion thereof. In some other embodiments not shown, mouse 10 may include additional buttons. A user may affect control through mouse 10 of a variety of programmable commands by clicking buttons 40 and 50 as well known in the field. A scroll wheel 100 is coupled to the lower housing 30 and disposed between buttons 40 and 50 with at least a portion of scroll wheel 100 exposed from the top of mouse 10. Scroll wheel 100 may be rotated by a user to effect, for example, scrolling and zooming on a window shown on a display of the computer. In some embodiments not shown, the scroll wheel 100 may also be clicked like buttons 40 and 50 to effect additional programmable commands. As illustrated, mouse 10 may include button 60 on the upper housing 20 and one or more buttons 70 at a side of lowing housing 30. In some embodiments, button 60 may be programed to effect switching the scroll wheel between a ratchet-scrolling mode and a continuous-scrolling mode. In some embodiments, buttons 70 may be programed to effect additional control commands, such as programmable shortcut key combinations.

Figure 2A:
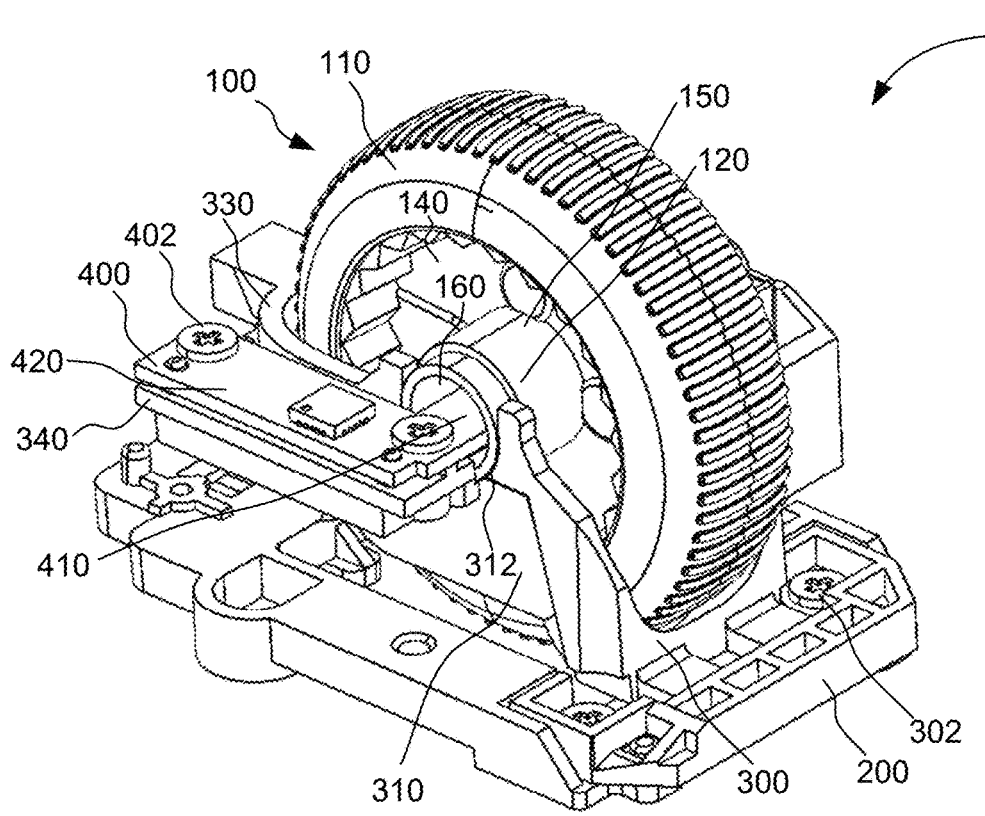
FIGS. 2A and 2B show the perspective view of a scroll wheel module of the mouse according to some embodiments of the present disclosure.
Figure 2B:
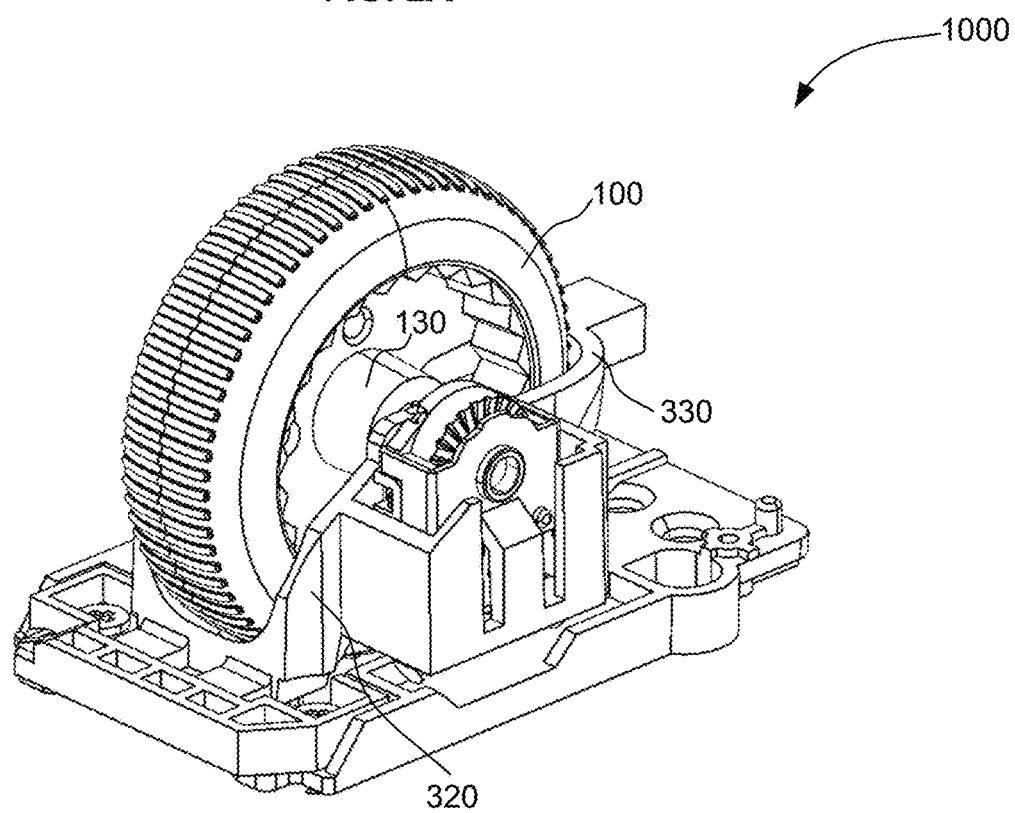

FIGS. 2A and 2B show the perspective view of scroll wheel module 1000 of mouse 10 according to some embodiments of the present disclosure. FIG. 2A shows scroll wheel module 1000 from a left front perspective, and FIG. 2B shows scroll wheel module 1000 from a right front perspective. For clarity of illustration, the remaining components of mouse 10, including the upper housing 20, lower housing 30, buttons 40, 50, 60, and 70 are omitted. In some embodiments, scroll wheel module 1000 may be coupled to lower housing 30. As shown in FIG. 2A, scroll wheel module 1000 may include a base plate 200 and a carriage 300 coupled to base plate 200. In some embodiments, base plate 200 may be coupled to the lower housing 30 via fasteners (now shown), for example, screws. As illustrated in FIGS. 2A and 2B, carriage 300 may be coupled at one end to base plate 200 via one or more fasteners 302, for example, screws. In the embodiment shown in FIG. 2A, carriage 300 is coupled to the front end of base plate 200. In some embodiments not shown, carriage 300 may be coupled at both ends thereof to base plate 200.

As shown in FIGS. 2A and 2B, carriage 300 includes two side walls 310 and 320 extending vertically and opposite to each other. Side walls 310 and 320 are connected by an arcuate section 330. In some embodiments, carriage 300 defines a cradle space encompassed by side walls 310 and 320 and arcuate section 330 to accommodate and support scroll wheel 100. In other words, scroll wheel 100 is at least partially rotatably received within the cradle space. In some embodiments, side walls 310 and 320 include wheel guides 312 and 322 formed therein to rotatably support shaft sections 120 and 130 of scroll wheel 100. Specifically, as shown in FIGS. 2A and 2B, side wall 310 includes wheel guide 312 formed in the upper middle section of side wall 310, and side wall 320 includes wheel guide 322 (shown in FIG. 3) formed in the upper middle section of side wall 320. As shown in FIG. 2A, scroll wheel 100 includes a wheel rim 110 and a wheel web 140 coupled peripherally to an inner side of the wheel rim 110. In some embodiments, scroll wheel 100 includes a shaft 150 consisting of two shaft sections 120 and 130 extending respectively and axially at either side of wheel web 140. As described above, shaft section 120 is supported in wheel guide 312 of side wall 310, and shaft section 130 is supported in wheel guide 322 of side wall 320. In some embodiments, shaft 150 defines a hollow interior 160 for accommodating light emitting elements as described below.

Figure 3:
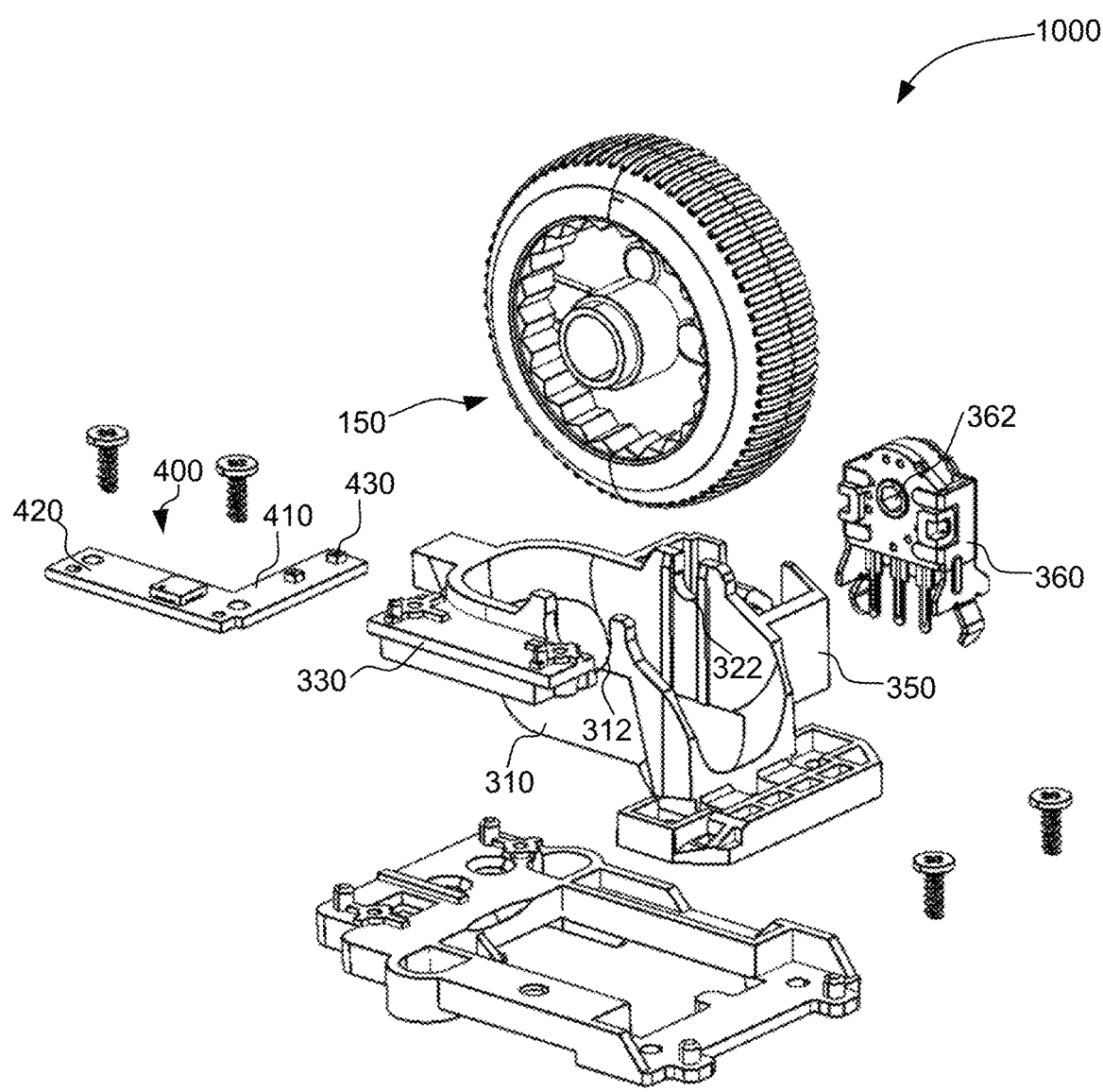
FIG. 3 shows an exploded perspective view of the scroll wheel module according to some embodiments of the present disclosure.

As shown in FIGS. 2 and 3, carriage 300 includes a support plate 340 extending horizontally outward from side wall 310 at the upper portion of side wall 310. In some embodiments, support plate 340 is formed substantially at the level of the axis of shaft 150 but a little lower than the axis of shaft 150. A circuit board 400 is coupled to support plate 340 via one or more fasteners 402, for example, screws. In some embodiments, circuit board 400 is configured as a L-shape board, with a first leg 410 extending into the hollow interior 160 and a second leg 420 fastened to support plate 340. In some embodiments, as shown in FIG. 3, one or more light emitting elements 430, such as light emitting diodes (LEDs), are coupled to first leg 410 to provide illumination for scroll wheel 100.

Turning now to FIG. 3, carriage 300 includes pocket 350 coupled to side wall 320. In some embodiments, an encoder 360 is received within pocket 350. In some embodiments, encoder 260 is rotatably coupled with shaft section 130 (shown in FIG. 2B). In some embodiments, encoder 360 may be used to determine a magnitude, speed, and/or direction of rotation of scroll wheel 100. In some embodiments, encoder 360 may be configured to generate haptic feedback to the finger of the user. In some embodiments not shown, additional sensors, such as optical sensors may be received in the pocket 350 to detect the movement of scroll wheel 100.

Figure 4:
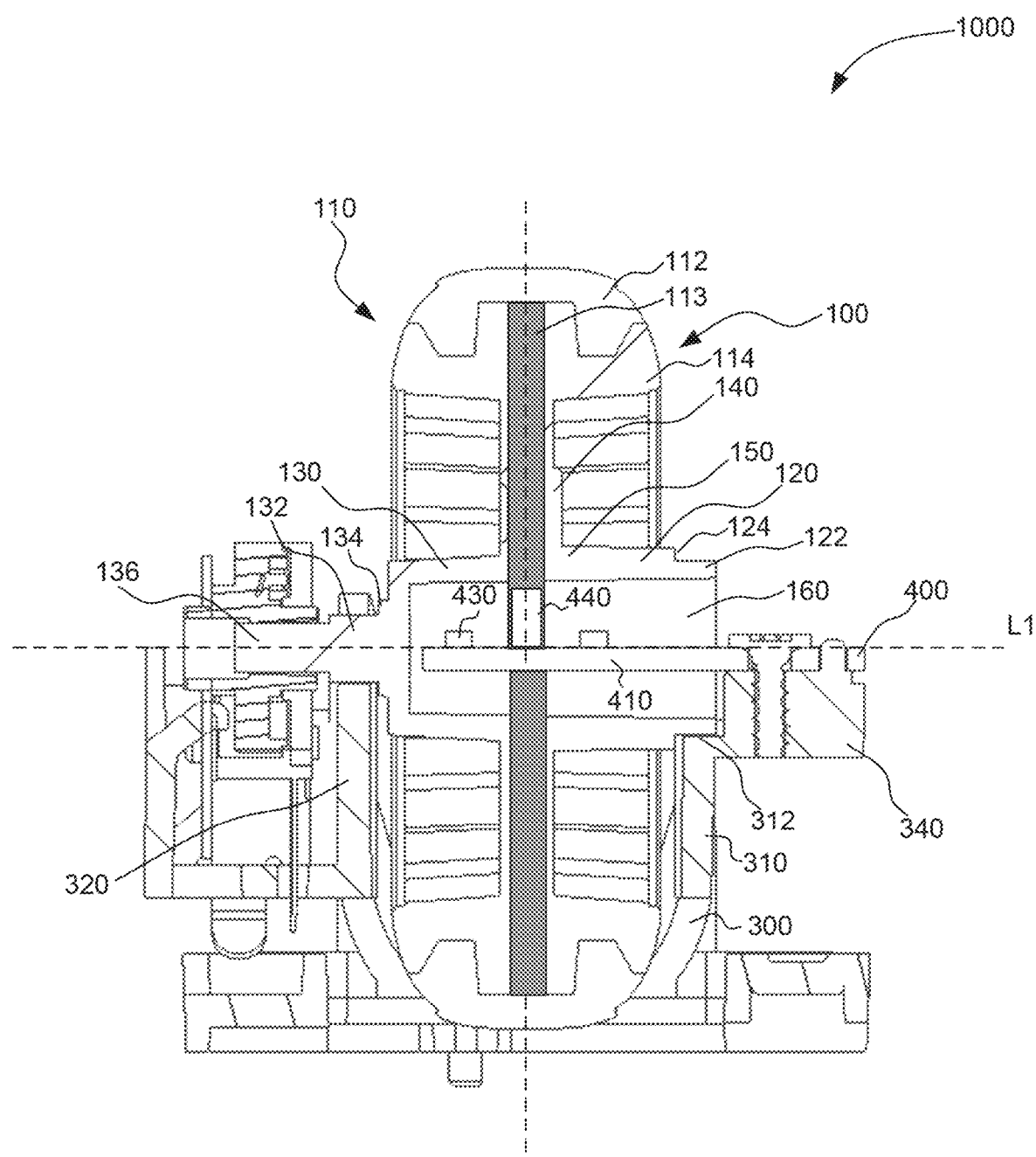
FIG. 4 shows a section view of the scroll wheel module according to some embodiments of the present disclosure.

FIG. 4 shows a section view of scroll wheel module 1000 according to some embodiments of the present disclosure. As shown in FIG. 4, the length of hollow interior 160 of shaft 150 extends a length corresponding to the axial thickness of scroll wheel 100. In some embodiments, shaft section 120 has a greater diameter than that of shaft section 130. However, it should be noted that it is not required by the present disclosure. In some other embodiments, shaft section 120 may have an equal or smaller diameter than that of shaft section 130. In some embodiments, support plate 340 is formed at such a level that the light emitting elements 430, after circuit board 400 being coupled to support plate 340, are disposed on the axis L1 of shaft 150. The light emitting elements 430 disposed on the axis of shaft 150 may provide uniform illumination as viewed from outside of mouse 10. It should be noted that the light emitting elements 430 are not required to be positioned on the axis of shaft 150. In some other embodiments not shown, light emitting elements 430 may be disposed off axis, for example, higher or lower than the level of the axis L1 of shaft 150. In some embodiments, circuit board 400 may include two light emitting elements 430 as shown in FIG. 4. These two light emitting elements may be evenly distributed along the length of first leg 410 of circuit board 400, with one light emitting element 430 positioned closer to the end of hollow interior 160 of shaft 150. In some other embodiments, circuit board 400 may include more light emitting elements 430, such as four or six light emitting elements 430 evenly distributed along the length of first leg 410 of circuit board 400. In some other embodiments, circuit board 400 may also include a single light emitting element 430. In this case, the light emitting element 430 may be positioned in the center of first leg 410 of circuit board 400.

As shown in FIG. 4, in some embodiments, circuit board 400 may further include an insulation member 440 positioned between the two light emitting elements 430 to prevent or at least mitigate the cross-talking produced by the two light emitting elements 430. For example, in some embodiments, the two light emitting elements 430 may be controlled or programmed to emit light of different colors. Light effect viewed by a user through scroll wheel 100 and/or the gap between scroll wheel 100 and buttons 40 and 50 may be degraded due to cross-talking of light of different colors. In some embodiments, insulation member 440 may include opaque insulation foam.

In some embodiments, as shown in FIG. 4, wheel rim 110 of scroll wheel 100 includes outer layer 112 and inner layer 114. Outer layer 112 is sleeved on inner layer 114. In some embodiments, out layer 112 may be formed by opaque rubber with a textured peripheral surface to facilitate the gripping by the user's finger to rotate scroll wheel 100, which will be further described below. In some embodiments, inner layer 114, wheel web 140, and shaft 150 could be formed by translucent plastic to facilitate light emitted by light emitting elements 430 to transmit through scroll wheel 100. In some embodiments, inner layer 114, wheel web 140, and shaft 150 could be formed as a one-piece structure that includes an opaque layer 113 axially sandwiched between two side portions. In some embodiments, opaque layer 113 may include opaque plastic. As shown in FIG. 4, the opaque layer 113 may further mitigate the cross-talking produced between light emitting elements 430.

As shown in FIG. 4, in some embodiments, shaft section 120 may include a support section 122 with a reduced diameter than the remaining portion of shaft section 120. As shown in the FIG. 4, support section 122 of shaft section 120 is rotatably supported within wheel guide 312. A shoulder 124 is formed at one end of support section 122. When support section 122 is received in wheel guide 312, shoulder 124 may provide a stopper against the inner surface of side wall 310 to prevent lateral movement of scroll wheel 100 within carriage 300. As shown in FIG. 4, shaft section 130 may similarly include a support section 132 with a reduced diameter than the remaining portion of shaft section 130. Support section 132 of shaft section 130 is rotatably supported within wheel guide 322. Similarly, a shoulder 134 is formed between support section 132 and remaining portions of shaft section 130 to provide a stopper against the inner surface of side wall 320 to prevent lateral movement of scroll wheel 100 within carriage 300. In some embodiments as shown in FIG. 4, shaft section 130 includes an end section 136 coupled to the support section 132. In some embodiments, end section 136 is received in a hole 362 (shown in FIG. 3) to interact with encoder 360 to determine a magnitude, speed, and/or direction of rotation of scroll wheel 100.

Figure 5:
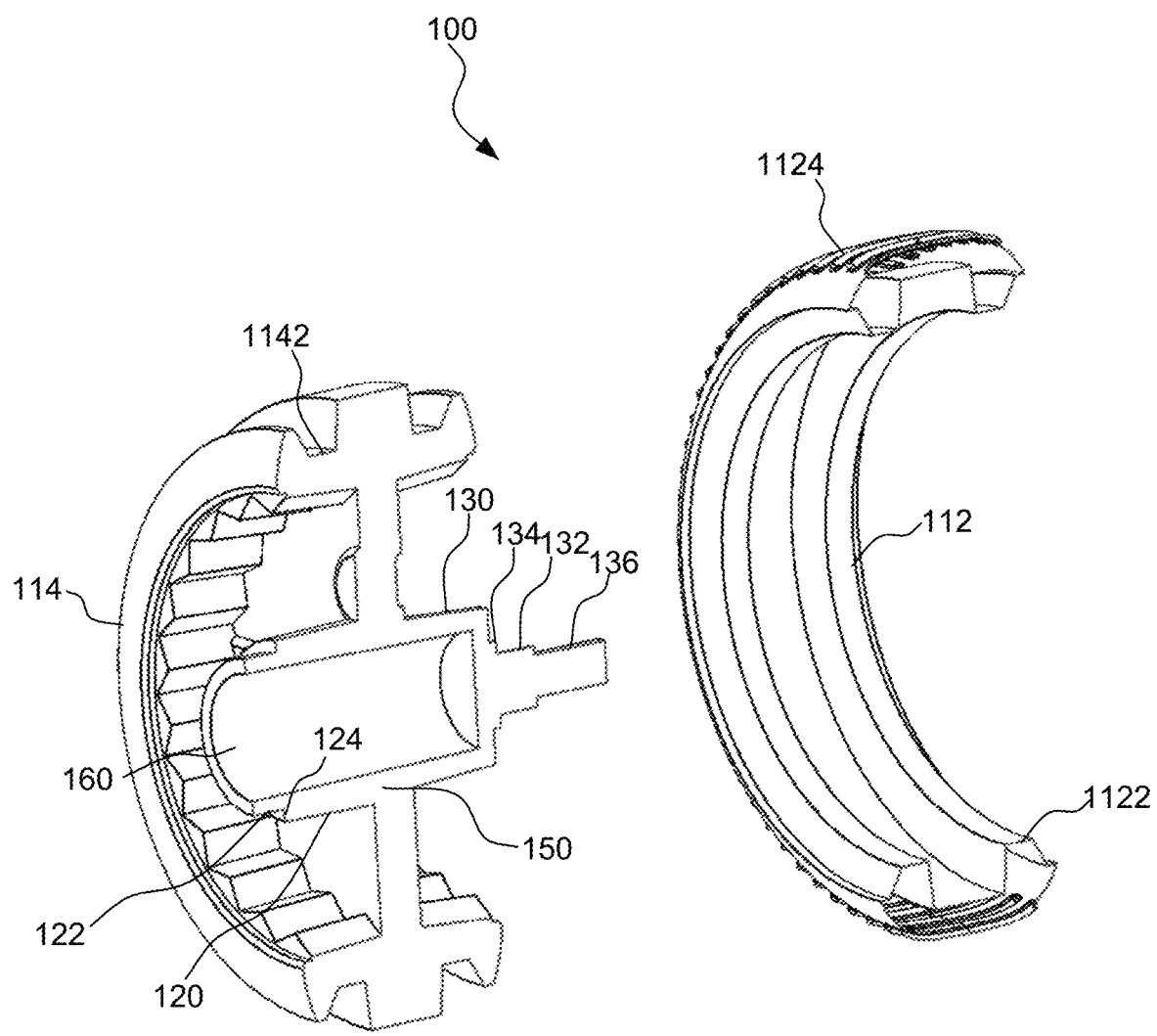
FIG. 5 shows an exploded sectional view of the scroll wheel according to some embodiments of the present disclosure.

FIG. 5 shows an exploded sectional view of the scroll wheel 100 according to some embodiments of the present disclosure. As illustrated, wheel rim 110 of scroll wheel 100 includes outer layer 112 and inner layer 114. Outer layer 112 is sleeved on the inner layer 114. In some embodiments, the outer peripheral of inner layer 114 includes two grooves 1142 spaced from each other. In this case, outer layer 112 may include at its inner peripheral two ridges 1122 that may fit within grooves 1142 to prevent outer layer 112 axially moving relative to inner layer 114. In some embodiments, outer layer 112 includes a plurality of beads 1124 formed on its outer peripheral surface and spaced from each other. The plurality of beads 1124 may improve the friction between scroll wheel 100 and a finger of the user when the finger rotates scroll wheel 100. However, the plurality of beads 1124 are not necessary in the present disclosure. In some other embodiments not shown, outer layer 112 may include other grooves, textures, or patterns on its outer peripheral surface to realize the same effect as the beads 1124.

Figure 6A:
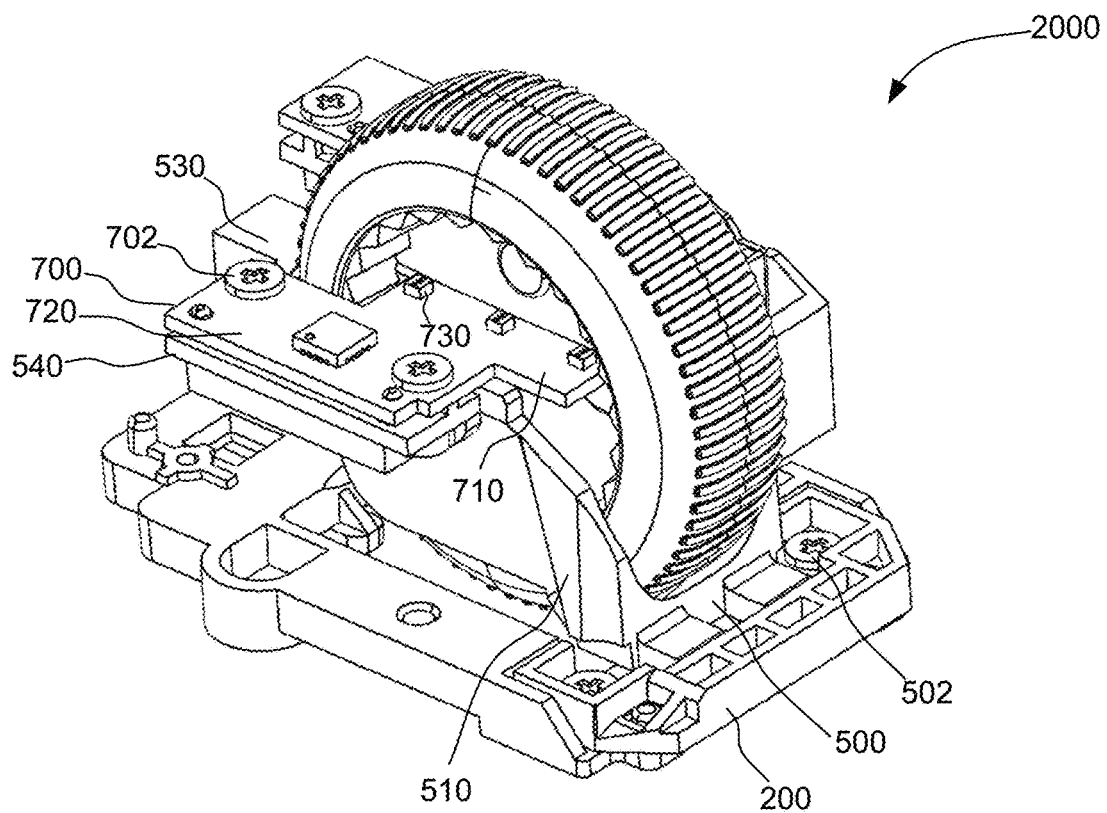
Figure 6B:
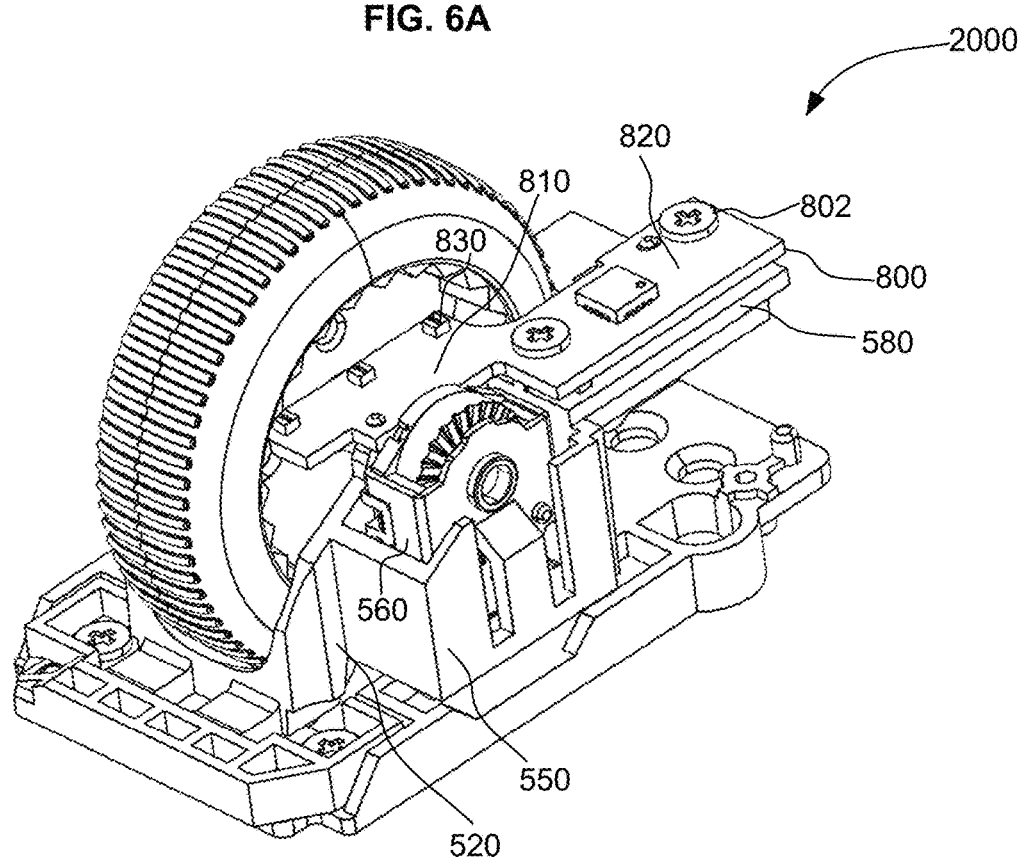
Figure 7:
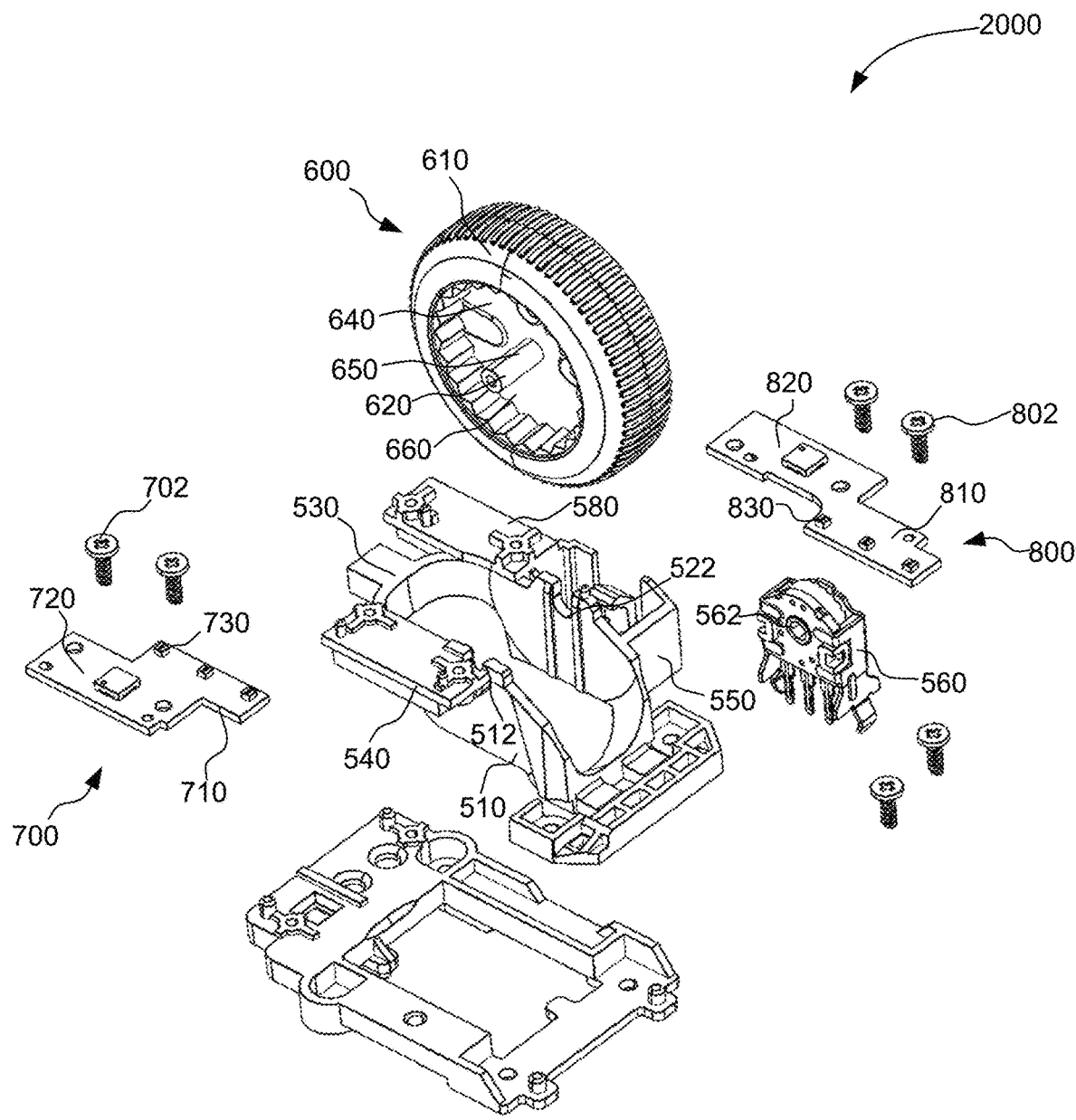
FIG. 7 shows an exploded perspective view of the scroll wheel module of the mouse according to some embodiments of the present disclosure.

FIGS. 6A and 6B show the perspective views of scroll wheel module 2000 of mouse 10 according to some embodiments of the present disclosure. FIG. 6A shows scroll wheel module 2000 from a left front perspective, and FIG. 6B shows scroll wheel module 2000 from a right front perspective. FIG. 7 shows an exploded perspective view of scroll wheel module 2000 of mouse 10 according to some embodiments of the present disclosure. For clarity of illustration, the remaining components of mouse 10, including the upper housing 20, lower housing 30, buttons 40, 50, 60, and 70 are omitted. In some embodiments, scroll wheel module 2000 may be coupled to lower housing 30. As shown in FIG. 6A, scroll wheel module 2000 may include a base plate 200 and a carriage 500 coupled to base plate 200. In some embodiments, base plate 200 may be coupled to the lower housing 30 via fasteners (now shown), for example, screws. As illustrated in FIGS. 6A and 6B, carriage 500 may be coupled at one end to base plate 200 via one or more fasteners 502, for example, screws. In the embodiment shown in FIG. 6A, carriage 500 is coupled to the front end of base plate 200. In some embodiments not shown, carriage 500 may be coupled at both ends thereof to base plate 200.

As shown in FIGS. 6A and 6B, carriage 500 may include two side walls 510 and 520 extending vertically and opposite to each other. Side walls 510 and 520 are connected by a arcuate section 530. In some embodiments, carriage 500 may define a cradle space encompassed by side walls 510 and 520 and arcuate section 530 to accommodate and support scroll wheel 600. In other words, scroll wheel 600 is at least partially rotatably received within the cradle space. In some embodiments, side walls 510 and 520 include wheel guides 512 and 522 (shown in FIG. 7) formed therein to rotatably support shaft sections 620 and 630 of scroll wheel 600. Tentatively referring to FIG. 7, side wall 510 includes wheel guide 512 formed in the upper middle section of side wall 510, and side wall 520 includes wheel guide 522 formed in the upper middle section of side wall 520. As shown in FIG. 7, scroll wheel 600 includes a wheel rim 610 and a wheel web 640 coupled peripherally to an inner side of the wheel rim 610. In some embodiments, scroll wheel 600 includes a shaft 650 consisting of two shaft sections 620 and 630 (shown in FIG. 8) extending respectively and axially at either side of wheel web 640. As described above, shaft section 620 is supported in wheel guide 512 of side wall 510, and shaft section 630 is supported in wheel guide 522 of side wall 520. In some embodiments, wheel rim 610 defines a recess space 660 at either side of wheel web 640.

Returning to FIG. 6A, carriage 500 includes a first support plate 540 extending horizontally outward from side wall 510 at the upper portion of side wall 510. In some embodiments, first support plate 540 is formed in the vertical direction at the level of the axis of shaft 650, or a little higher than the level of axis of shaft 650 in some other embodiments. A first circuit board 700 is coupled to first support plate 540 via one or more fasteners 702, for example, screws. In some embodiments, first circuit board 700 is configured as a L-shape board, with a first leg 710 horizontally extending into the recess space 660 and a second leg 720 fastened to first support plate 540. In some embodiments, first circuit board 700 is positioned over shaft 650 to avoid interference with the rotation of shaft 650 as scroll wheel 600 is rotated. In some embodiments, as shown in FIG. 6A, one or more light emitting elements 730, such as light emitting diodes (LEDs), are coupled to first leg 710 to provide illumination for scroll wheel 600. As illustrated in FIG. 6A, first circuit board 700 may include three light emitting elements 730 distributed along the length of first leg 710. In some embodiments, the light emitting element 730 in the middle may be aligned with the axis of shaft 650, with the remaining two light emitting elements 730 positioned evenly at the two sides of the middle light emitting element 730. This configuration may improve the evenness of the light distribution across the scroll wheel 600 when viewing from outside of mouse 10.

As shown in FIGS. 6B and 7, in some embodiments, carriage 500 may include a second support plate 580 extending horizontally outward from side wall 520 at the upper portion of side wall 520. In some embodiments, second support plate 580 is formed in the vertical direction at the level of the axis of shaft 650, or a little higher than the level of axis of shaft 650 in some other embodiments. A second circuit board 800 is coupled to second support plate 580 via one or more fasteners 802, for example, screws. In some embodiments, second circuit board 800 is configured as a L-shape board, with a first leg 810 horizontally extending into the recess space 660 and a second leg 720 fastened to second support plate 580. As illustrated, first leg 810 is received in recess space 660 on the opposite side of wheel web 640. Similarly, in some embodiments, second circuit board 800 is positioned over shaft 650 to avoid interference with the rotation of shaft 650 as scroll wheel 600 is rotated. In some embodiments, as shown in FIGS. 6B and 7, one or more light emitting elements 830, such as light emitting diodes (LEDs), are coupled to first leg 810 to provide illumination for scroll wheel 600. As illustrated in FIG. 6B, second circuit board 800 may include three light emitting elements 830 distributed along the length of first leg 810. In some embodiments, the light emitting element 830 in the middle may be aligned with the axis of shaft 650, with the remaining two light emitting elements 830 positioned evenly at the two sides of the middle light emitting element 830. This configuration may improve the evenness of the light distribution across the scroll wheel 600 when viewing from outside of mouse 10.

Turning now to FIGS. 6B and 7, carriage 500 includes pocket 550 coupled to side wall 520. In some embodiments, an encoder 560 is received within pocket 550. In some embodiments, encoder 560 is rotatably coupled with shaft section 630 (shown in FIG. 8). In some embodiment, encoder 560 may be used to determine a magnitude, speed, and/or direction of rotation of scroll wheel 600. In some embodiments, encoder 560 may be configured to generate haptic feedback to the finger of the user. In some embodiments not shown, additional sensors, such as optical sensors may be received in the pocket 550 to detect the movement of scroll wheel 600.

Figure 8:
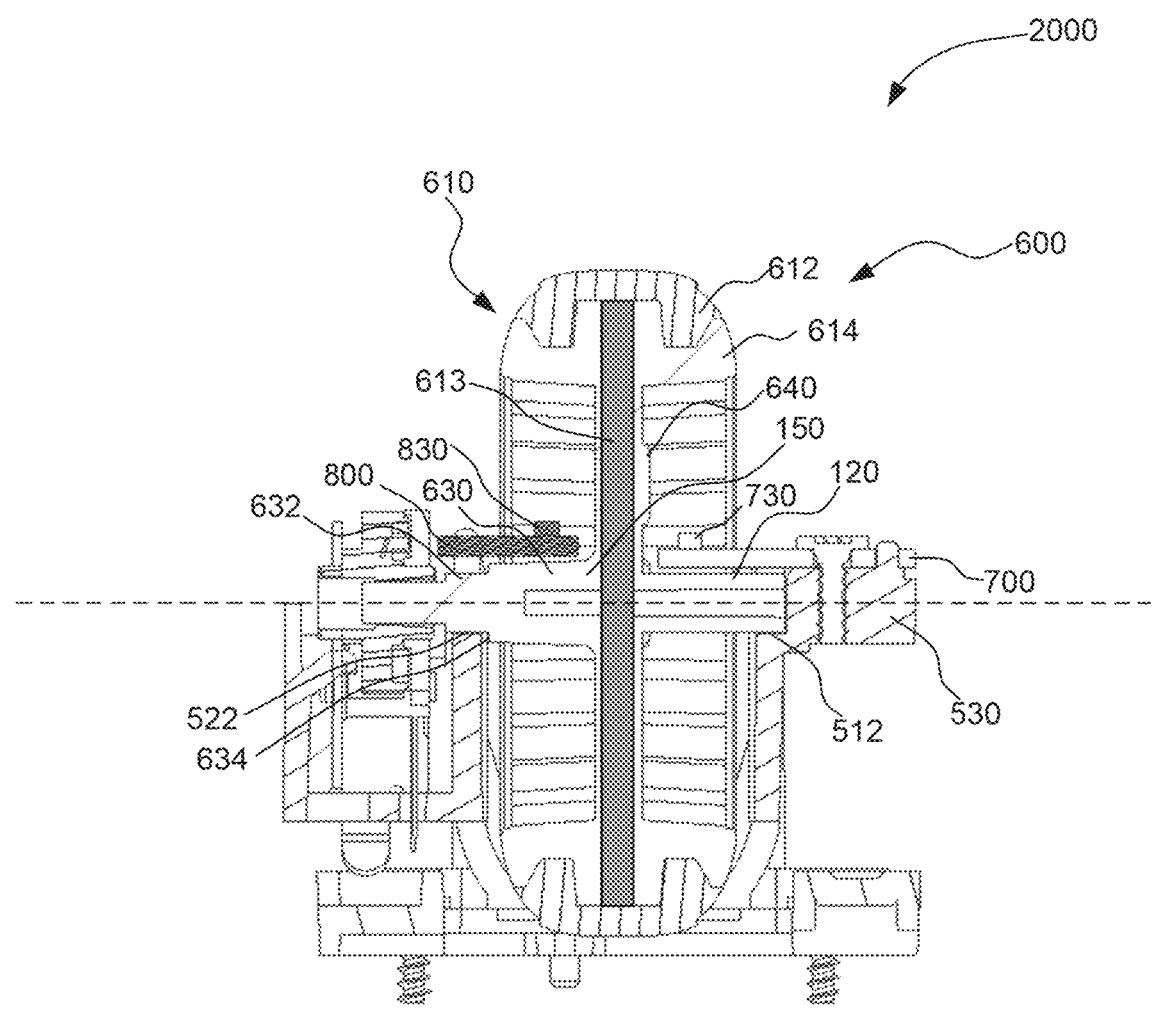
FIG. 8 shows a section view of the scroll wheel module according to some embodiments of the present disclosure.

FIG. 8 shows a section view of scroll wheel module 2000 according to some embodiments of the present disclosure. As illustrated, in some embodiments, wheel rim 610 of scroll wheel 600 includes outer layer 612 and inner layer 614, which will be further described below with reference to FIG. 9. Outer layer 612 is sleeved on inner layer 614. In some embodiments, out layer 612 may be formed by opaque rubber with a textured peripheral surface to facilitate the gripping by user's finger to rotate scroll wheel 600, which will be further described below. In some embodiments, inner layer 614, wheel web 640, and shaft 650 could be formed by translucent plastic to facilitate light emitted by light emitting elements 830 to transmit through scroll wheel 600. In some embodiments, inner layer 614, wheel web 640, and shaft 650 could be formed as a one-piece structure. In the embodiments including light emitting elements 730 and 830 at both sides of wheel web 640, the one-piece structure may include an opaque layer 613 axially sandwiched between two side portions. In some embodiments, opaque layer 613 may include opaque plastic. As shown in FIG. 8, the opaque layer 613 may further mitigate the cross-talking produced between light emitting elements 730 and 830.

As shown in FIG. 8, shaft section 630 may similarly include a support section 632 with a reduced diameter than the remaining portion of shaft section 630. Support section 632 of shaft section 630 is rotatably support within wheel guide 522. Similarly, a shoulder 634 is formed between support section 632 and the remaining portions of shaft section 630 to provide a stopper against the inner surface of side wall 520 to prevent lateral movement of scroll wheel 600 within carriage 500. In some embodiments as shown in FIG. 8, shaft section 630 include an end section 636 coupled to the support section 632. In some embodiments, end section 636 is received in a hole 562 (shown in FIG. 7) to interact with encoder 560 to determine a magnitude, speed, and/or direction of rotation of scroll wheel 600.

Figure 9:
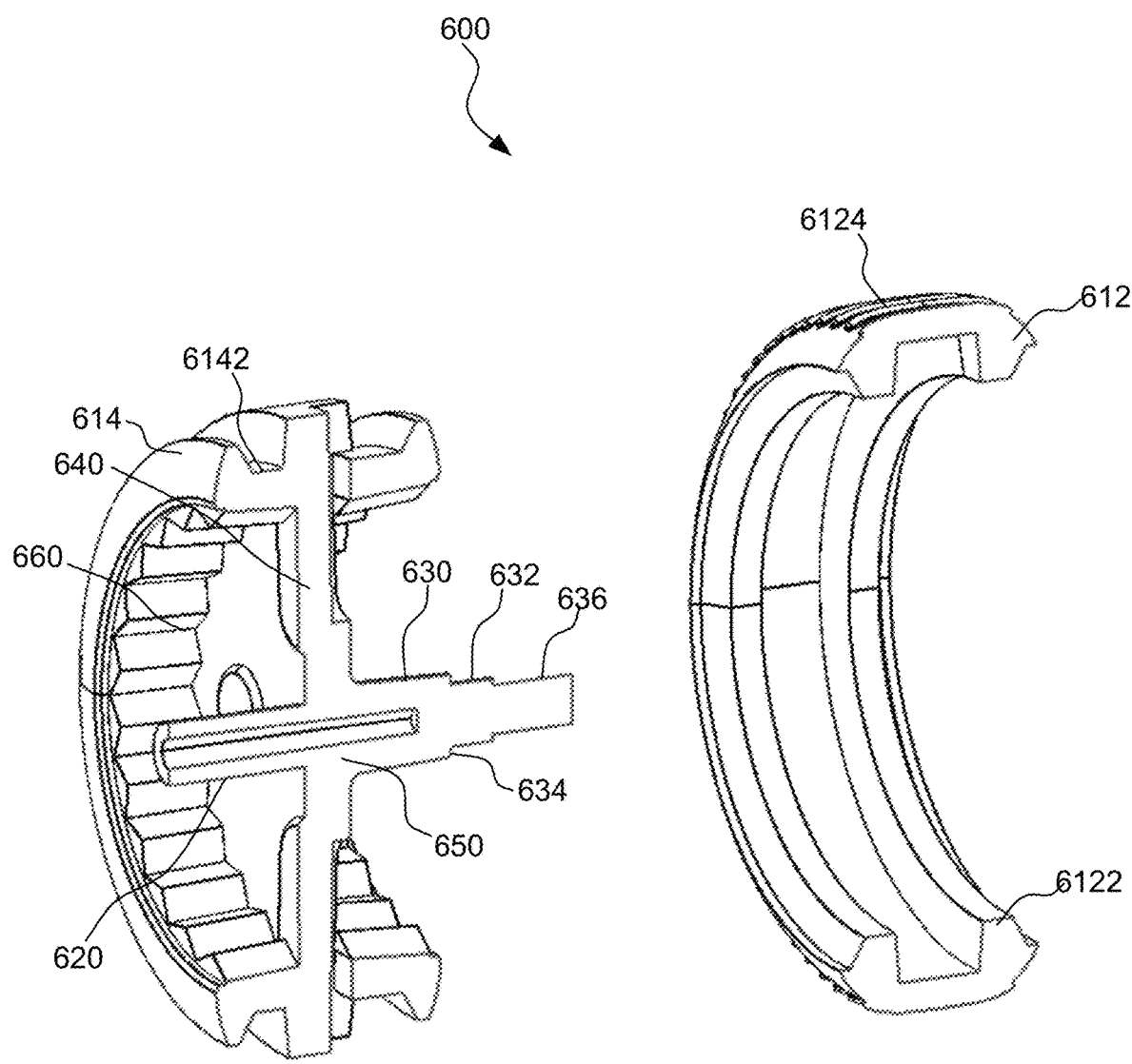
FIG. 9 shows an exploded sectional view of the scroll wheel according to some embodiments of the present disclosure.

FIG. 9 shows an exploded sectional view of the scroll wheel 600 according to some embodiments of the present disclosure. As illustrated, wheel rim 610 of scroll wheel 600 may include outer layer 612 and inner layer 614. Outer layer 612 is sleeved on the inner layer 614. In some embodiments, the outer peripheral of inner layer 614 includes two grooves 6142 spaced from each other. In this case, outer layer 612 may include at its inner peripheral two ridges 6122 that may fit within grooves 6142 to prevent outer layer 612 axially from moving relative to inner layer 614. In some embodiments, outer layer 612 may include a plurality of beads 6124 formed on its outer peripheral surface and spaced from each other. The plurality of beads 6124 may improve the friction between scroll wheel 600 and user's finger when a finger of the user rotates scroll wheel 600. However, the plurality of beads 6124 are not necessary in the present disclosure. In some other embodiments not shown, outer layer 612 may include other grooves, textures, or patterns on its outer peripheral to realize the same effect as the beads 6124.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A scroll wheel module for a mouse, comprising:
   a base plate;
   a carriage coupled to the base plate, wherein the carriage defines a cradle space comprising a first side wall;
   a scroll wheel, wherein the scroll wheel comprises:
      a shaft defining a hollow interior;
      a wheel rim comprising an outer layer and an inner layer coupled to the outer layer; and
      a wheel web peripherally coupled to an inner side of the inner layer of the wheel rim, wherein the shaft axially passes through the wheel web;
   a circuit board comprising a first leg and a second leg coupled with each other, wherein the first leg is coupled to the first side wall, and the second leg extends in the hollow interior of the shaft; and
   one or more light emitting elements coupled to the second leg of the circuit board.

2. The scroll wheel module of claim 1, wherein the one or more light emitting elements comprise two light emitting elements, wherein an insulation element is positioned between the two light emitting elements.

3. The scroll wheel module of claim 1, wherein the scroll wheel comprises an opaque layer axially sandwiched between two side portions.

4. The scroll wheel module of claim 1, wherein a support plate horizontally extends from the first side wall and is coupled to the first side wall, and the circuit board is coupled to the support plate.

5. The scroll wheel module of claim 4, wherein the support plate is disposed substantially at a height of an axis of the shaft, and circuit board is configured to have the one or more light emitting elements are aligned with the axis of the shaft.

6. The scroll wheel module of claim 1, wherein the inner layer of the wheel rim, the wheel web, and the shaft are formed in a one-piece structure made by a translucent plastic material.

7. The scroll wheel module of claim 1, wherein the outer layer of the wheel rim comprises a plurality of beads disposed on an outer surface thereof and spaced from each other.

8. The scroll wheel module of claim 1, wherein the cradle space comprises a second side wall opposite the first side wall, wherein a pocket is coupled to the second side wall, wherein an encoder is received with in the pocket and coupled with the shaft of the scroll wheel.

9. A scroll wheel module for a mouse, comprising:
   a base plate;
   a carriage coupled to the base plate, wherein the carriage defines a cradle space comprising a first side wall;
   a scroll wheel at least partially rotatably received within the cradle space, wherein the scroll wheel comprises a wheel rim, a wheel web peripherally coupled to the wheel rim, and a shaft axially passing through the wheel web, wherein the wheel rim defines a recess space at either side of the wheel web;
   a first circuit board comprising a first leg and a second leg coupled with each other, wherein the first leg is coupled to the first side wall, and the second leg extends in the recess space; and
   one or more light emitting elements coupled to the second leg of the first circuit board,
   wherein a first support plate horizontally extends from the first side wall and is coupled to the first side wall, and the first circuit board is coupled to the first support plate.

10. The scroll wheel module of claim 9, wherein the first support plate extends at a height over the shaft.

11. The scroll wheel module of claim 9, wherein the cradle space further comprises a second side wall opposite the first side wall, and the scroll wheel module further comprises:
   a second circuit board comprising a third leg and a fourth leg coupled with each other, wherein the third leg is coupled to the second side wall, and the fourth leg extends in the recess space; and
   one or more light emitting elements coupled to the fourth leg of the second circuit board.

12. The scroll wheel module of claim 11, wherein a second support plate horizontally extends from the second side wall and is coupled to the second side wall, and the second circuit board is coupled to the second support plate.

13. The scroll wheel module of claim 12, wherein the second support plate extends at a height over the shaft.

14. The scroll wheel module of claim 11, wherein the scroll wheel comprises an opaque layer axially sandwiched two side portions.

15. The scroll wheel module of claim 9, wherein the wheel rim comprises an outer layer and an inner layer coupled to the outer layer.

16. The scroll wheel module of claim 15, wherein the inner layer of the wheel rim, the wheel web, and the shaft are formed in a one-piece structure made by a translucent plastic material.

17. The scroll wheel module of claim 15, wherein the outer layer of the wheel rim comprises a plurality of beads disposed on an outer surface thereof and spaced from each other.

* * * * *